United States Patent

Nakamura et al.

[11] Patent Number: 5,994,461
[45] Date of Patent: Nov. 30, 1999

[54] LIQUID SILICONE RUBBER COMPOSITION FOR APPLICATION TO HIGH-VOLTAGE ELECTRICAL INSULATORS AND ARTICLES

[75] Inventors: Akito Nakamura; Yasumichi Shigehisa; Yuichi Tsuji, all of Chiba Prefecture, Japan

[73] Assignee: Dow Corning Toray Silicone Co., Ltd., Tokyo, Japan

[21] Appl. No.: 09/104,920

[22] Filed: Jun. 25, 1998

[30] Foreign Application Priority Data

Jun. 25, 1997 [JP] Japan ..................................... 9-184382

[51] Int. Cl.$^6$ ....................................... C08L 83/04
[52] U.S. Cl. ......................... 524/862; 524/837; 524/493; 524/588; 528/15; 528/31; 528/32; 525/478
[58] Field of Search ..................................... 524/847, 493, 524/588, 862; 528/15, 31, 32; 525/478

[56] References Cited

U.S. PATENT DOCUMENTS

| | | | |
|---|---|---|---|
| 4,322,518 | 3/1982 | Blizzard | 528/15 |
| 5,373,078 | 12/1994 | Juen et al. | 528/15 |
| 5,548,038 | 8/1996 | Enami et al. | 525/478 |
| 5,756,598 | 5/1998 | Chung et al. | 525/478 |
| 5,863,969 | 1/1999 | Ward et al. | 523/213 |

FOREIGN PATENT DOCUMENTS 53-35982 of 1978 Japan .
62-26124 of 1987 Japan .
4-209655 of 1992 Japan .

*Primary Examiner*—Melvyn I. Marquis
*Assistant Examiner*—Mark W. Milstead
*Attorney, Agent, or Firm*—Jennifer S. Warren; William F. Boley

[57] ABSTRACT

A high voltage electrical insulator formed from a curable liquid silicone rubber composition, and subsequently cured, a composition consisting essentially of
(A) 100 weight parts of a fluid mixture of polyorganosiloxane comprising
  (a) at least 5 weight percent of a polyorganosiloxane resin comprising repeating units selected from the group consisting of $SiO_{4/2}$ and $RSiO_{3/2}$, where R is a monovalent hydrocarbon group, and
  (b) polydiorganosiloxane having a viscosity in the range from about 100 mPa·s to 100,000 mPa·s, that contains at least 2 silicon-bonded alkenyl groups in each molecule,
(B) 1 to 100 weight parts microparticulate silica,
(C) polyorganohydrogensiloxane that contains at least 2 silicon-bonded hydrogen atoms in each molecule, in a quantity that provides a value from 0.5:1 to 20:1 for the ratio of the number of moles of silicon-bonded hydrogen in the instant composition to the number of moles of silicon-bonded alkenyl in component (A), and
(D) a catalytic quantity of a platinum catalyst.
The liquid silicone rubber composition, prior to its cure, evidences a desirable fluidity and excellent moldability. Upon its cure the composition produces very mechanically strong silicone rubber moldings that have excellent high-voltage insulating properties tracking resistance, erosion resistance, arcing resistance without the use of fillers such as aluminum oxide, aluminum hydroxide or quartz.

17 Claims, No Drawings

5,994,461

LIQUID SILICONE RUBBER COMPOSITION FOR APPLICATION TO HIGH-VOLTAGE ELECTRICAL INSULATORS AND ARTICLES

FIELD OF THE INVENTION

This invention relates to high-voltage electrical insulators and articles formed from liquid silicone rubber compositions. More particularly, this invention relates to a high-voltage insulating (HVI) liquid silicone rubber composition that, prior to its cure, exhibits a suitable fluidity and an excellent moldability. The compositions of this invention cure to give silicone rubber moldings that have excellent mechanical strength and excellent high-voltage insulating properties, including resistance to tracking, resistance to erosion, and resistance to arcing. Compositions of this invention are well-suited for application to high-voltage insulators and articles such as anode caps, plug boots, insulators, flame-retardant wire and cable, and so forth.

BACKGROUND OF THE INVENTION

Silicone rubbers have excellent electrical characteristics and as a result are frequently used for high-voltage insulators and articles such as anode caps, plug boots, insulators, flame-retardant wire and cable, and the like. The silicone rubber compositions used for these applications have typically contained large amounts of inorganic filler, e.g., aluminum hydroxide powder, aluminum oxide powder, or quartz powder. See, for example, Japanese Patent Publication 53-35982, Japanese Patent Publication 62-26124, and Japanese Patent Application Laid Open Number 4-209655.

However, liquid silicone rubber compositions that are highly loaded with these inorganic fillers have very high viscosities. This gives these compositions poor moldability, and makes them difficult to use in applications that require the fluidities appropriate for injection molding or casting materials. In addition, the silicone rubber moldings afforded by the cure of highly filled silicone rubber compositions have low mechanical strengths. Under conditions of exposure to severe soiling or the weather, these compositions will also suffer from such deterioration phenomena as tracking and erosion due to the high electrical stresses, which results in a drastic decline in their high-voltage insulating properties and has prevented these compositions from being completely acceptable.

Therefore, there is a need for a liquid silicone rubber composition that prior to its cure has a desirable fluidity and excellent moldability, and that can be cured to give very mechanically strong silicone rubber moldings that have excellent high-voltage insulating properties.

SUMMARY OF THE INVENTION

The invention is a high voltage electrical insulator formed from a curable liquid silicone rubber composition, and subsequently cured, a composition consisting essentially of
(A) 100 weight parts of a fluid mixture of polyorganosiloxane comprising
  (a) at least 5 weight percent of a polyorganosiloxane resin comprising repeating units selected from the group consisting of $SiO_{4/2}$ and $RSiO_{3/2}$, where R is a monovalent hydrocarbon group, and
  (b) polydiorganosiloxane having a viscosity in the range from about 100 mPa·s to 100,000 mPa·s, that contains at least 2 silicon-bonded alkenyl groups in each molecule,
(B) 1 to 100 weight parts microparticulate silica,
(C) polyorganohydrogensiloxane that contains at least 2 silicon-bonded hydrogen atoms in each molecule, in a quantity that provides a value from 0.5:1 to 20:1 for the ratio of the number of moles of silicon-bonded hydrogen in the instant composition to the number of moles of silicon-bonded alkenyl in component (A), and
(D) a catalytic quantity of a platinum catalyst

DETAILED DESCRIPTION OF THE INVENTION

The inventors have discovered that high voltage electrical insulators can be formed from an addition reaction-curable liquid silicone rubber composition whose base ingredient is a particular polyorganosiloxane has unexpectedly good electrical properties without the use of inorganic fillers typically used for electrical resistance, such as aluminum oxide, aluminum hydroxide, or quartz. The components are formed from a high voltage insulating (HVI) liquid silicone rubber composition consisting essentially of:
(A) 100 weight parts of a fluid mixture of polyorganosiloxane comprising
  (a) at least 5 weight percent of a polyorganosiloxane resin comprising repeating units selected from the group consisting of $SiO_{4/2}$ and $RSiO_{3/2}$, where R is a monovalent hydrocarbon group, and
  (b) polydiorganosiloxane having a viscosity in the range from about 100 mPa·s to 100,000 mPa·s, that contains at least 2 silicon-bonded alkenyl groups in each molecule,
(B) 1 to 100 weight parts microparticulate silica,
(C) polyorganohydrogensiloxane that contains at least 2 silicon-bonded hydrogen atoms in each molecule, in a quantity that provides a value from 0.5:1 to 20:1 for the ratio of the number of moles of silicon-bonded hydrogen in the instant composition to the number of moles of silicon-bonded alkenyl in component (A), and
(D) a catalytic quantity of a platinum catalyst.

The HVI liquid silicone rubber composition according to the present invention, because it comprises components (A) to (D) and in particular because it contains (a) polyorganosiloxane resin containing the $SiO_{4/2}$ unit and/or $RSiO_{3/2}$ unit in its component (A), evidences a desirable fluidity and excellent moldability prior to its cure and upon its cure provides very mechanically strong silicone rubber moldings that have excellent high-voltage insulating properties.

Component (A) is the base ingredient of the composition. This component (A) preferably has a viscosity at 25° C. in the range from 100 centipoise to 100,000 centipoise and more preferably from 100 centipoise to 50,000 centipoise. Viscosities below the given range result in a decline in the mechanical strength of the cured silicone rubber, while viscosities in excess of the given range result in a reduced fluidity and hence in a reduced moldability for the liquid silicone rubber composition. The organopolysiloxane resin (a) encompassed by component (A) functions to improve the high-voltage insulating properties while at the same time also improving the mechanical strength of the cured silicone rubber. The subject organopolysiloxane resin must contain the $SiO_{4/2}$ siloxane unit and/or the $RSiO_{3/2}$ siloxane unit within the molecule. R in the preceding formula represents substituted and unsubstituted monovalent hydrocarbon groups, for example, alkyl groups such as methyl, ethyl, and propyl; alkenyl groups such as vinyl, allyl, and propenyl; aryl groups such as phenyl and tolyl; and haloalkyl groups such as 3,3,3-trifluoropropyl and 3-chloropropyl. In addition to the required siloxane units as described above, this organopolysiloxane resin may contain the $R_3SiO_{1/2}$ siloxane unit and the $R_2SiO_{2/2}$ siloxane unit where R is defined as above. The subject organopolysiloxane resin (a) is preferably soluble in the organopolysiloxane constituting component (b). Component (a) can be specifically exemplified by methylpolysiloxane resin composed of the $SiO_{4/2}$ and $(CH_3)_3SiO_{1/2}$ units; methylpolysiloxane resin composed of the $SiO_{4/2}$, $(CH_3)_3SiO_{1/2}$, and $(CH_3)SiO_{3/2}$ units; polyvinylmethylsiloxane resin composed of the $SiO_{4/2}$, $(CH_3)_3SiO_{1/2}$, and $(CH_2=CH)(CH_3)_2SiO_{1/2}$ units; polyvinylmethylsiloxane resin composed of the $SiO_{4/2}$, $(CH_2=CH)(CH_3)_2SiO_{1/2}$, and $(CH_2=CH)SiO_{3/2}$ units; methylphenylpolysiloxane resin composed of the $PhSiO_{3/2}$ (Ph=phenyl) and $(CH_3)_2SiO_{2/2}$ units; and methylphenylvinylpolysiloxane resin composed of the $PhSiO_{3/2}$ and $(CH_2=CH)(CH_3)SiO_{2/2}$ units. Although component (a) can range from a liquid at ambient temperature to a solid at ambient temperature, it should generally have a viscosity at 25° C. from 100 to 100,000 centipoise and preferably from 100 to 50,000 centipoise. When silicone resin that is solid at ambient temperature is used, it is preferably used dissolved in the diorganopolysiloxane (b). The proportion of component (a) in component (A) can be from 5 to 100 weight % and is preferably from 10 to 70 weight %. When the component (a) content below 5 weight percent, there is no improvement in high-voltage insulating properties and a reduced strength on the part of the cured silicone rubber.

The polydiorganosiloxane constituting component (b) must contain at least 2 alkenyl groups in each molecule in order for cure of the composition according to the present invention to provide a rubbery elastic silicone rubber. The subject alkenyl is exemplified by vinyl, allyl, and propenyl. The non-alkenyl organic groups in component (b) are exemplified by substituted and unsubstituted monovalent hydrocarbon groups, e.g., alkyl such as methyl, ethyl, and propyl; aryl such as phenyl and tolyl; and haloalkyl such as 3,3,3-trifluoropropyl and 3-chloropropyl. The molecular structure of this component will generally be straight chain, but some branching may be present. The alkenyl in component (b) may be present at terminal or pendant position on the molecular chain or at both positions. Moreover, only a single type of alkenyl group may be present or a combination of two or more types of alkenyl groups may be present. Component (b) can be specifically exemplified by dimethylvinylsiloxy-endblocked polydimethylsiloxanes, dimethylvinylsiloxy-endblocked dimethylsiloxane-methylvinylsiloxane copolymers, and dimethylvinylsiloxy-endblocked dimethylsiloxane-methylphenylsiloxane copolymers. The viscosity of component (b) at 25° C. should be in the range from 100 to 100,000 centipoise and preferably falls in the range from 100 to 50,000 centipoise.

The microparticulate silica (B) is a reinforcing filler and functions mainly to impart mechanical strength to the composition according to the present invention. The subject microparticulate silica can be exemplified by dry-process silicas such as fumed silicas and by wet-process silicas such as precipitated silicas. Preferred among these are fumed silicas with specific surface areas of at least 50 $m^2/g$. Particularly preferred are fumed silicas with specific surface areas of at least 100 $m^2/g$ whose surface has been treated with an organosilicon compound selected from the group consisting of organosilanes, organosilazanes, organosiloxane oligomers, and mixtures of the preceding. Component (B) is admixed at from 1 to 100 weight parts per 100 weight parts component (A) and preferably at from 10 to 40 weight parts per 100 weight parts component (A). A high level of mechanical strength will not be obtained when the addition of component (B) falls below the given range, while the addition of component (B) in excess of the given range causes the viscosity of the composition according to the present invention to become excessively large and causes a loss of the fluidity that is a characteristic feature of liquid silicone rubber compositions.

The polyorganosiloxane (C) is a crosslinker for the composition according to the present invention. More specifically, the composition according to the present invention is crosslinked and thereby cured by the addition reaction of the silicon-bonded hydrogen in component (C) with the silicon-bonded alkenyl in component (A) in the presence of the platinum catalyst (D). The organopolysiloxane (C) must contain at least 2 silicon-bonded hydrogen atoms in each molecule. The organic groups present in (C) in addition to the silicon-bonded hydrogen can be nonexhaustively exemplified by alkyl groups such as methyl, ethyl, and propyl; aryl groups such as phenyl and tolyl; and substituted alkyl groups such as 3,3,3-trifluoropropyl and 3-chloropropyl. The molecular structure of component (C) can be straight chain, branched straight chain, cyclic, or network. While the molecular weight of component (C) is not critical, this component preferably has a viscosity at 25° C. from 3 to 10,000 centipoise. Component (C) is added in a quantity that provides a value from 0.5:1 to 20:1 and preferably from 1:1 to 3:1 for the ratio of the number of moles of silicon-bonded hydrogen in the composition to the number of moles of silicon-bonded alkenyl. The composition according to the present invention will not undergo adequate cure when this molar ratio falls below 0.5:1, while a value in excess of 20:1 will cause the generation of excess hydrogen gas and foaming.

The platinum catalyst (D) is a curing catalyst for the composition according to the present invention. This platinum catalyst can be exemplified by chloroplatinic acid, alcohol solutions of chloroplatinic acid, complexes between chloroplatinic acid and olefins, complexes between chloroplatinic acid and divinylsiloxanes, platinum black, platinum, and supported platinum. The addition of component (D) will vary as a function of the particular type of platinum catalyst and thus cannot be strictly specified. However, as a general rule component (D) will be added at from 1 to 1,000 weight parts and preferably at from 5 to 100 weight parts, in each case as platinum metal proper for each 1,000,000 weight parts component (A).

The composition according to the present invention can be prepared simply by mixing the above-described components (A) to (D) to homogeneity in their specified quantities. The mixing sequence for components (A) to (D) is not crucial to this process, but in a preferred embodiment components (A) and (B) are first mixed with heating under reduced pressure, the resulting mixture is then cooled to afford a silicone rubber base compound, (C) and (D) are subsequently mixed into this silicone rubber base compound.

The composition according to the present invention may optionally contain a heretofore known addition-reaction inhibitor, for example, ethynylcyclohexanol, dimethylformamide, triphenylphosphine, cyclic methylvinylsiloxane, 3-methyl-1-butyn-3-ol, 3,5-dimethyl-1-hexyn-3-ol, cyclohexylbutynol, 3-phenyl-1-butyn-3-ol, diphenylethynyl carbinol, and 3,5-dimethyl-3-hexen-1-yne. The composition according to the present invention may also optionally contain the heretofore known reinforcing fillers, semireinforcing fillers, nonreinforcing fillers, flame retardants, heat stabilizers, and adhesion promoters. While the composition according to the present invention basically must be a fluid silicone rubber composition that manifests liquidity at ambient temperature, its viscosity at 25° C. preferably falls in the range from 500 to 100,000 poise.

EXAMPLES

The invention is explained below through working examples, in which "parts" denotes "weight parts" and the values reported for organopolysiloxane viscosity were measured at 25° C. The physical properties of the silicone rubber moldings were measured by the methods stipulated in JIS K-6301. To evaluate the high-voltage insulating properties, an inclined plane antitracking test was carried out in accordance with the method stipulated in IEC Publication 587 using a model HAT-520 from Hitachi Kasei Kogyo Kabushiki Kaisha. The test voltage was 4.5 kV. The evaluation A referenced in the table refers to the time in minutes required until the current flowing in a high-voltage circuit passing through the test specimen exceeded 60 mA. The evaluation B referenced in the table refers to the time in minutes for tracking to reach a mark placed on the surface of the test specimen at a position 25 mm from the lower electrode. The erosion was evaluated visually and scored on the following 5-level scale: micro, small, moderate, strong, and deep.

Example 1

20 parts surface-treated fumed silica with a specific surface of 200 m$^2$/g (surface pretreated with hexamethyldisilazane) was mixed to homogeneity into 100 parts of a liquid mixture of organopolysiloxane composed of 35 weight percent polyvinylmethylsiloxane resin (weight-average molecular weight=4,000, vinyl group content=2 weight %, consisting of 30 mole % SiO$_{4/2}$ units 68.4 mole % (CH$_3$)$_3$SiO$_{1/2}$ units, and 1.6 mole % of (CH$_2$=CH)(CH$_2$)$_2$SiO$_{1/2}$ and 65 weight % dimethylvinylsiloxy-endblocked polydimethylsiloxane (viscosity=2,000 centipoise, silicon-bonded vinyl content=0.23 weight %). The mixture was additionally heated for 1 hour at 170° C. under a vacuum. The following were then homogeneously incorporated into the resulting mixture to give a liquid silicone rubber composition: 1.4 parts trimethylsiloxy-endblocked dimethylsiloxane-methylhydrogensiloxane copolymer (silicon-bonded hydrogen content=0.7 weight %) and, as curing catalyst, chloroplatinic acid sufficient to provide 5 ppm platinum metal. This liquid silicone rubber composition was cured by heating for 5 minutes at 150° C. to give a silicone rubber molding in the form of a sheet. This silicone rubber molding was submitted to measurement of its physical properties and high-voltage insulating properties. The obtained measurement results are reported in Table 1.

Example 2

20 parts fumed silica with a specific surface of 200 m$^2$/g and, as surface treatment agent for the silica, 3 parts hexamethyldisilazane and 1 part water, were mixed to homogeneity into 100 parts of a liquid mixture of polyorganosiloxane composed of 35 weight % polyvinylmethylsiloxane resin (weight-average molecular weight=4,000, vinyl group content=2 weight %, consisting of 30 mole % SiO$_{4/2}$ units 68.4 mole % (CH$_3$)$_3$SiO$_{1/2}$ units, and 1.6 mole % of (CH$_2$=CH)(CH$_2$)$_2$SiO$_{1/2}$ and 65 weight % dimethylvinylsiloxy-endblocked polydimethylsiloxane (viscosity=2,000 centipoise, silicon-bonded vinyl content=0.23 weight %). The mixture was additionally heated for 3 hours at 170° C. under a vacuum. The following were then homogeneously incorporated into the resulting mixture to give a liquid silicone rubber composition: 1.4 parts trimethylsiloxy-endblocked dimethylsiloxane-methylhydrogensiloxane copolymer (silicon-bonded hydrogen content=0.7 weight %) and, as curing catalyst, chloroplatinic acid sufficient to provide 5 ppm platinum metal. This liquid silicone rubber composition was cured by heating for 5 minutes at 150° C. to give a silicone rubber molding in the form of a sheet. This silicone rubber molding was submitted to measurement of its physical properties and high-voltage insulating properties. The obtained measurement results are reported in Table 1.

Example 3

20 parts surface-treated fumed silica with a specific surface of 200 m2/g (surface pretreated with hexamethyldisilazane) was mixed to homogeneity into 100 parts of a liquid mixture of organopolysiloxane composed of 15 weight percent polyvinylmethylsiloxane resin (weight-average molecular weight=4,000, vinyl group content=2 weight %, consisting of 30 mole % SiO$_{4/2}$ units 68.4 mole % (CH$_3$)$_3$SiO$_{1/2}$ units, and 1.6 mole % of (CH$_2$=CH)(CH$_2$)$_2$SiO$_{1/2}$ and 85 weight % dimethylvinylsiloxy-endblocked polydimethylsiloxane (viscosity=2,000 centipoise, silicon-bonded vinyl content=0.23 weight %). The mixture was additionally heated for 1 hour at 170° C. under a vacuum. The following were then homogeneously incorporated into the resulting mixture to give a liquid silicone rubber composition: 1.4 parts trimethylsiloxy-endblocked dimethylsiloxane-methylhydrogensiloxane copolymer (silicon-bonded hydrogen content=0.7 weight %) and, as curing catalyst, chloroplatinic acid sufficient to provide 5 ppm platinum metal. This liquid silicone rubber composition was cured by heating for 5 minutes at 150° C. to give a silicone rubber molding in the form of a sheet. This silicone rubber molding was submitted to measurement of its physical properties and high-voltage insulating properties. The obtained measurement results are reported in Table 1.

Comparative Example 1

A liquid silicone rubber composition was prepared as in Example 1, but in this case using 100 parts dimethylvinylsiloxy-endblocked polydimethylsiloxane (viscosity=2,000 centipoise, silicon-bonded vinyl content=0.23 weight %) in place of the 100 parts liquid mixture of organopolysiloxane composed of 35 weight % polyvinylmethylsiloxane resin (weight-average molecular weight=4,000, vinyl group content=2 weight %, consisting of 30 mole % SiO$_{4/2}$ units 68.4 mole % (CH$_3$)$_3$SiO$_{1/2}$ units, and 1.6 mole % of (CH$_2$=CH)(CH$_2$)$_2$SiO$_{1/2}$ and 65 weigh % dimethylvinylsiloxy-endblocked polydimethylsiloxane (viscosity=2,000 centipoise, silicon-bonded vinyl content=0.23 weight %) that was used in Example 1. The resulting liquid silicone rubber composition was cured by heating for 5 minutes at 150° C. to give a silicone rubber molding in the form of a sheet. This silicone rubber molding was submitted to measurement of its physical properties and high-voltage insulating properties. The obtained measurement results are reported in Table 1.

TABLE 1

|  | Example 1 | Example 2 | Example 3 | Comparative Example 1 |
|---|---|---|---|---|
| polyvinylmethylsiloxane resin (wt %) | 35 | 35 | 15 | — |
| dimethylvinylsiloxy-endblocked polydimethylsiloxane (wt %) | 65 | 65 | 85 | 100 |
| surface-treated fumed silica (parts) | 20 | — | 20 | 20 |
| fumed silica (parts) | — | 20 | — | — |
| hexamethyldisilazane/water (parts) | — | 3/1 | — | — |
| trimethylsiloxy-endblocked dimethylsiloxane-methylhydrogensiloxane copolymer (parts) | 1.4 | 1.4 | 1.4 | 1.4 |
| chloroplatinic acid (ppm platinum metal) | 5 | 5 | 5 | 5 |
| composition viscosity (poise) | 1,000 | 3,000 | 900 | 800 |
| *physical properties* | | | | |
| durometer (JIS A) | 65 | 64 | 40 | 25 |
| tensile strength (kgf/cm$^2$) | 100 | 90 | 60 | 25 |
| elongation (%) | 200 | 200 | 250 | 450 |
| tear strength (A) (kgf/cm) | 15 | 14 | 10 | 3 |
| *high voltage insulating properties (antitracking)* | | | | |
| evaluation A (minutes) | ≧360 | ≧360 | ≧360 | 80 |
| evaluation B (minutes) | ≧360 | ≧360 | ≧360 | 50 |
| erosion | micro | micro | small | deep |

We claim:

1. A high voltage electrical insulator formed from a curable liquid silicone rubber composition, consisting essentially of
   (A) 100 weight parts of a fluid mixture of polyorganosiloxane comprising
      (a) at least 5 weight percent of a polyorganosiloxane resin comprising repeating units selected from the group consisting of $SiO_{4/2}$ and $RSiO_{3/2}$, where R is a monovalent hydrocarbon group, and
      (b) polydiorganosiloxane having a viscosity in the range from about 100 mPa·s to 100,000 mPa·s and comprising at least 2 silicon-bonded alkenyl groups in each molecule,
   (B) 1 to 100 weight parts microparticulate silica,
   (C) polyorganohydrogensiloxane comprising at least 2 silicon-bonded hydrogen atoms in each molecule, in a quantity that provides a value from 0.5:1 to 20:1 for the ratio of the number of moles of silicon-bonded hydrogen in the instant composition to the number of moles of silicon-bonded alkenyl in component (A), and
   (D) a catalytic quantity of a platinum catalyst.

2. The high voltage electrical insulator of claim 1, where each R is selected from the group consisting of methyl, ethyl, propyl, vinyl, allyl, propenyl, phenyl, tolyl, 3,3,3-trifluoropropyl, and 3-chloropropyl.

3. The high voltage electrical insulator of claim 1, where R in resin (a) is selected from the group consisting of methyl, vinyl, and phenyl.

4. The high voltage electrical insulator of claim 1, where the resin further comprises repeating units selected from the group consisting of $R^1R^2SiO_{2/2}$ and $R^3R^4R^5SiO_{1/2}$ where $R^1,R^2,R^3,R^4$, and $R^5$ represent independently selected monovalent hydrocarbon groups.

5. The high voltage electrical insulator of claim 4 where $R^1,R^2,R^3,R^4$, and $R^5$ are independently selected from the group consisting of methyl, ethyl, propyl, vinyl, allyl, propenyl, phenyl, tolyl, 3,3,3-trifluoropropyl, and 3-chloropropyl.

6. The high voltage electrical insulator of claim 4 where $R^1,R^2,R^3,R^4$, and $R^5$ are independently selected from the group consisting of methyl, vinyl, and phenyl.

7. The high voltage electrical insulator of claim 1 where the resin comprises $SiO_{4/2}$ and $(CH_3)_3SiO_{1/2}$ units.

8. The high voltage electrical insulator of claim 7 where the resin further comprises $(CH_3)SiO_{3/2}$ units.

9. The high voltage electrical insulator of claim 7 where the resin further comprises $(CH_2=CH)(CH_3)_2SiO_{1/2}$.

10. The high voltage electrical insulator of claim 1 where the resin comprises $SiO_{4/2}$, $(CH_2=CH)(CH_3)_2SiO_{1/2}$, and $(CH_2=SiO_{3/2}$ units.

11. The high voltage electrical insulator of claim 1 where the resin comprises $PhSiO_{3/2}$, and $(CH_3)_2SiO_{2/2}$ units, where Ph represents phenyl.

12. The high voltage electrical insulator of claim 1 where the resin comprises $PhSiO_{3/2}$ and $(CH_2=CH)(CH_3)SiO_{2/2}$ units, where Ph represents phenyl.

13. The high voltage electrical insulator of claim 1 where the polydiorganosiloxane (b) is has a viscosity in the range of from about 100 mPa·s to 50,000 mPa·s at 25° C.

14. The high voltage electrical insulator of claim 1 where the polydiorganosiloxane is selected from the group consisting of dimethylvinylsiloxy-endblocked polydimethylsiloxane, dimethylvinylsiloxy-endblocked dimethylsiloxane-methylivinylsiloxane copolymer, and dimethylsiloxane-methylphenylsiloxane copolymer.

15. The high voltage eletrical insulator of claim 1 where the microparticulate silica has a specific surface area of at least 100 m$^2$/g.

16. The high voltage eletrical insulator of claim 1 where ingredient (C) is added in a quantity that provides a balue from 1:1 to 3:1 for the ratio of the number of moles of silicon-bonded hydrogen in (C) to the number of moles of silicon-bonded alkenyl in (A).

17. The high voltage eletrical insulator of claim 1 where the platinum catalyst is selected from the group consisting of chloroplatinic acid, alcohol solutions of chloroplatinic acid, complexes of chloroplatinic acid and olefins, complexes between chloroplatinic acid and divinylsiloxane, platinum black, and supported platinum.

* * * * *